United States Patent
Chiang

(10) Patent No.: US 6,799,347 B1
(45) Date of Patent: Oct. 5, 2004

(54) WIPER SPOILER

(75) Inventor: Min-Heng Chiang, Taipei Hsien (TW)

(73) Assignee: Fu Gang Co., Ltd., Taipei Hsien (TW)

( * ) Notice: Subject to any disclaimer, the term of this patent is extended or adjusted under 35 U.S.C. 154(b) by 0 days.

(21) Appl. No.: 10/665,070

(22) Filed: Sep. 22, 2003

(51) Int. Cl.[7] .................................................. B60S 1/32
(52) U.S. Cl. ................................ 15/250.201; 15/250.44
(58) Field of Search ........................ 15/250.201, 250.44, 15/250.32, 250.361, 250.46

(56) References Cited

U.S. PATENT DOCUMENTS

| | | | | |
|---|---|---|---|---|
| 6,338,178 B1 | * | 1/2002 | Leu ........................ | 15/250.201 |
| D453,316 S | * | 2/2002 | Watanabe ................... | D12/219 |
| 6,343,401 B1 | * | 2/2002 | Harashima .............. | 15/250.201 |
| D464,012 S | * | 10/2002 | Hussaini et al. ........... | D12/219 |
| D472,510 S | * | 4/2003 | Lin ........................... | D12/219 |

FOREIGN PATENT DOCUMENTS

EP          0499829    *   1/1992    ............ 15/250.201

* cited by examiner

Primary Examiner—Gary K. Graham
(74) Attorney, Agent, or Firm—Leong C. Lei

(57) ABSTRACT

A wiper spoiler providing more consistent and reliable wiping results is essentially comprised of a front and a rear spoils respectively extending at a certain inclination downwardly from the front and the rear bottom edges of a wiper arm; the front spoil indicating a corrugated form having its front edge curved downwardly, and rear edge provided with multiple slots in various lengths having their edges curved downwardly; the rear spoiler having a lower central part with both ends slightly elevated and its outer edge curved downwardly; pressure created along the front spoiler by the wind escaping from multiple slots to avoid producing wind resistance; and the rear spoiler functioning as a reinforced rib to prevent the wiper arm from deformation to create downward pressure

2 Claims, 5 Drawing Sheets

WIPER SPOILER

BACKGROUND OF THE INVENTION

1. Technical Field of the Invention

The present invention is related to a wiper spoiler, and more particularly to one that provides better effects of wiping off the storm water by reducing wind resistance and preventing the wiper in operation from jittering.

2. Description of the Prior Art

While a wiper on a windshield is working during a rainy day and there is only a wiper arm to support the wiper, the storm water wiping effect is affected due to wind lift when the automobile drives at various speeds since. Therefore, an improvement as illustrated in FIG. 1 of the accompanying drawings is provided by having extending a spoiler 101 from the front edge of a wiper 10. Though the spoiler 101 help the wiping more consistent, the problem of the jittering wiper remains unsolved since the wiper 10 is in a tail wind when it wipes upwardly; and against the wind, downwardly. That is, one side of the wiper is subject to the wind resistance when it moves downward, particularly when the automobile is driving at higher speed.

SUMMARY OF THE INVENTION

The primary purpose of the present invention is to provide a wiper spoiler for the wiper to reduce the wind resistance and prevent from jittering for achieving more reliable wiping.

To achieve the purpose, the wiper spoiler is comprised of a front and a rear spoils respectively extending at a certain inclination downwardly from the front and the rear bottom edges of a wiper arm. The front spoil indicating a corrugated form having its front edge curved downwardly. Multiple slots in various lengths are provided at where the front spoiler is connected to the wiper arm with their edges curved downwardly. The rear spoiler has a lower central part with both ends slightly elevated and its outer edge curved downwardly. Accordingly, once the wiper is turned on, a pressure is created along the front spoiler by the wind. The pressure escapes from those multiple slots to prevent the wiper from being lifted up by the wind The rear spoiler functions as were a reinforced rib to prevent the wiper arm from deformation while creating a turbulence for being subject to the wind pressure and the turbulence presents a downward pressure to balance the downward pressure created on both sides of the wiper to achieve a better consistent wiping cycles, thus to improve the results of wiping out the storm water.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
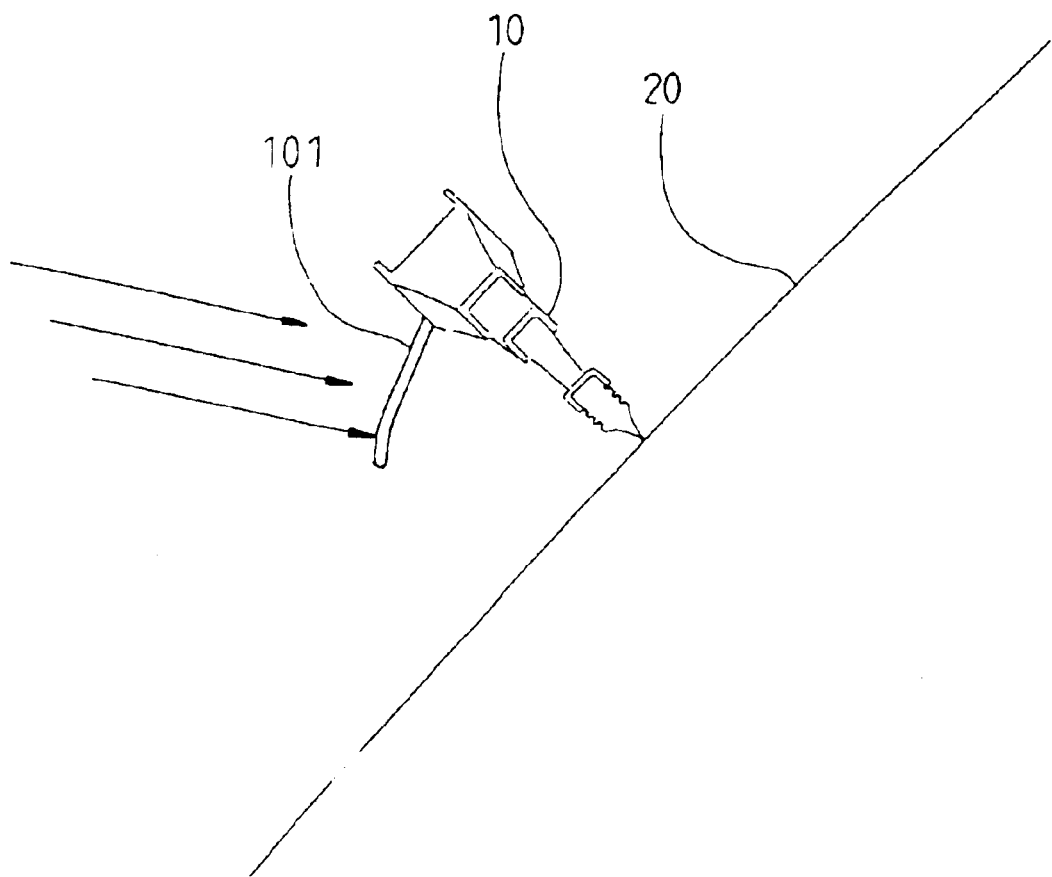
FIG. 1 is a preferred embodiment of the structure and operation of a wiper of the prior art.
Figure 2:
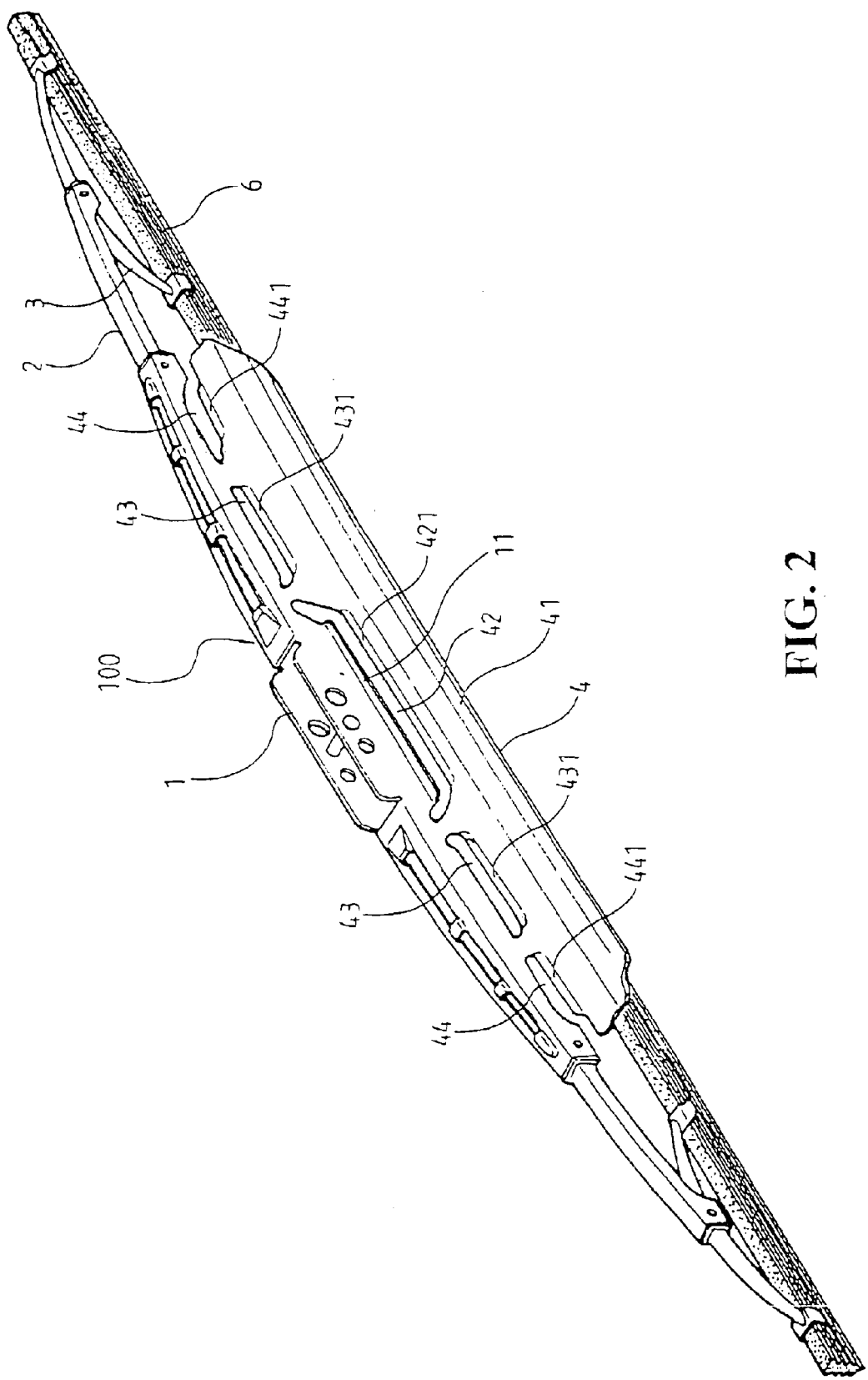
FIG. 2 is a perspective view of a preferred embodiment of the present invention.
Figure 3:
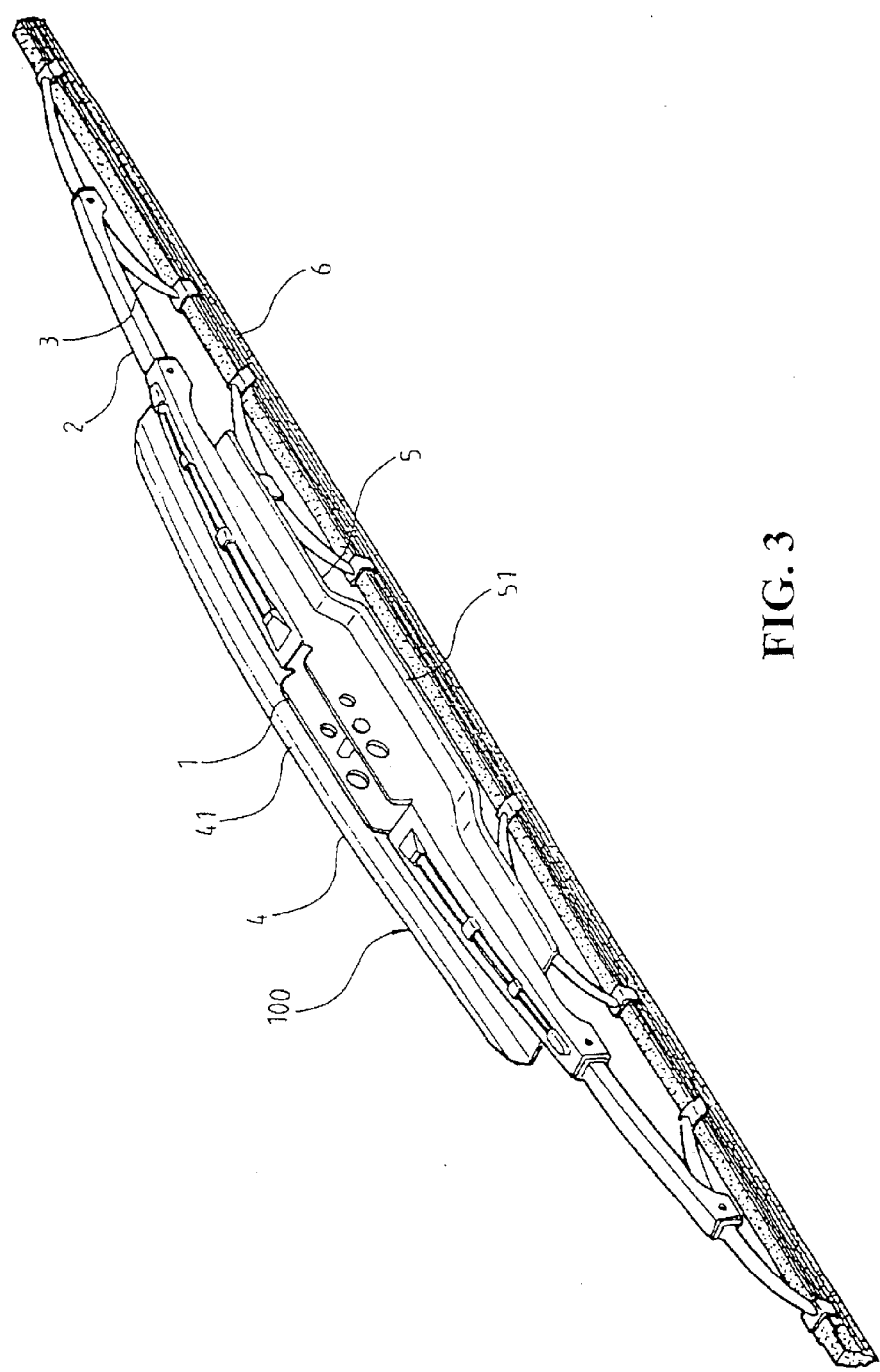
FIG. 3 is another perspective view of the preferred embodiment of the present invention taking from a different angle.
Figure 4:
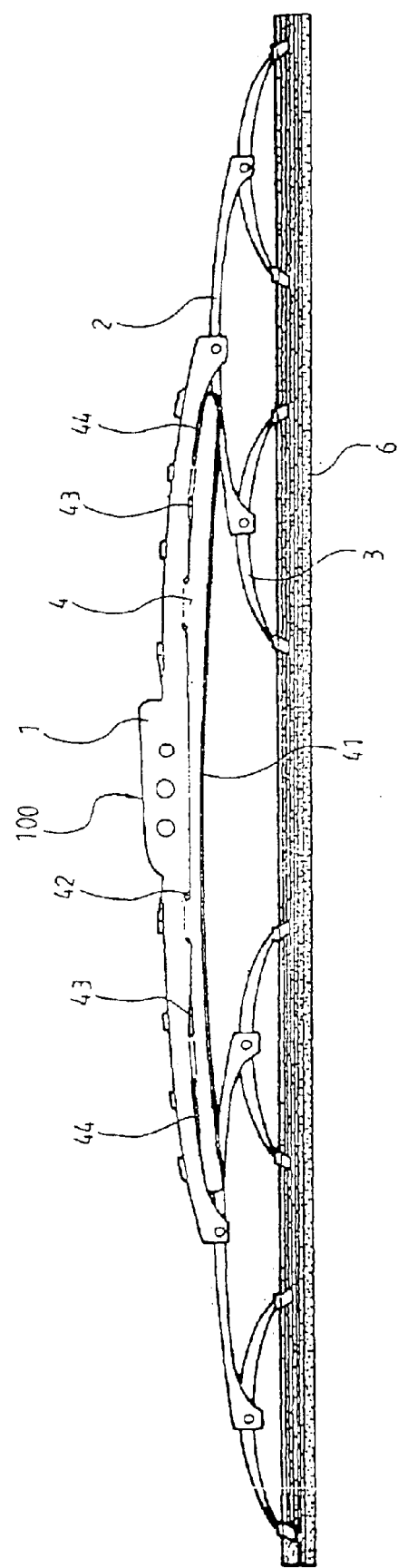
FIG. 4 is a front view of the preferred embodiment of the present invention.

Referring to FIGS. 2, 3 and 4, a preferred embodiment of the present invention is essentially comprised of a wiper 100 including a wiper arm comprised of a seat 1, two wings 2 respectively riveted to both sides of the seat 1, and two fork 3 respectively riveted to both ends of each wing 2; a front spoiler 4, a rear spoiler 5, and a rubber wiper blade 6. At the front and the rear bottom edges of the seat 1 are respectively extended downwardly at a certain inclination the front spoiler 4 and the rear spoiler 5. Wherein, the front spoiler 4 relates to a plate having its both ends formed each an arc angle and indicating on its surface approximately an "S" shaped corrugated form. The front edge of the front spoiler 4 is provided with a downwardly curved section 41. A longer slot 42 sandwiched by two shorter slots 43 are provided at where the rear edge of the front spoiler 4 is connected to the seat I while both ends of the seat 1 is each provided with an opening 44. The longer slot 42, both shorter slots 43 and both openings 44 are respectively provided at their lower edges downward curved sections 421, 431, 441. The lower edge of the seat 1 in relation to the longer slot 42 is provided with a laterally folded section 1 facing forwardly. The rear spoiler 5 has a lower central part and both ends of rear spoiler 5 are slightly elevated where respectively at their outer edges a curved section 51 is each provided.

When assembled, the wiper 100 is turned on in a rainy day. The wind pressure in front produces a pressure along the front spoiler 4, then escapes through the longer slot 42 and both shorter slots 43 provided at the rear edge of the front spoiler 4 to prevent the wiper from being lifted by the wind resistance. The rear spoiler 5 functions as were a reinforced rib to prevent the seat from being deformed during the work cycles of the wiper 100; meanwhile a downward pressure is created from the turbulence produced by the wind pressure to balance that from the rear spoiler 4 for the wiper 100 to achieve more reliable and consistent results of wiping off the storm water.

Figure 5:
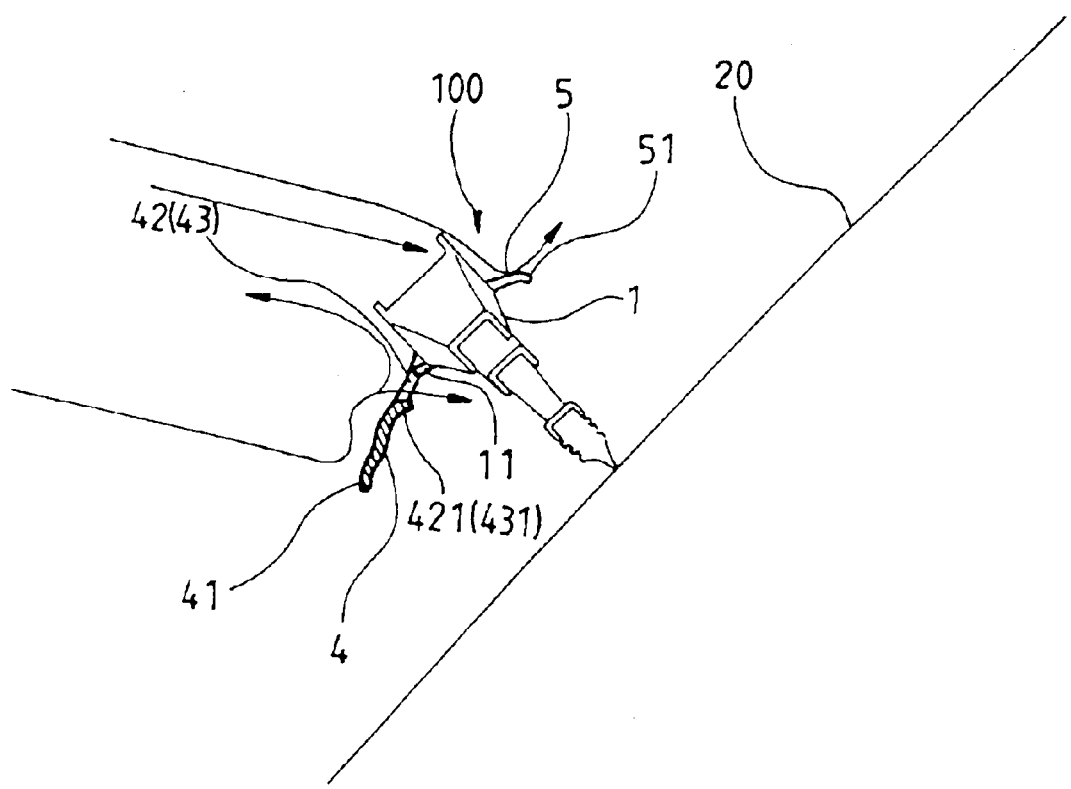
FIG. 5 is a schematic view showing that the preferred embodiment of the present invention is in operation.

As illustrated in FIG. 5, the wiper 100 is tuned on to move up and down in cycle on a windshield 20. The wind while passing through the front spoiler 4 creates a pressure on the corrugated surface of the front spoiler 4, then fast escapes from the longer slot 42 and two shorter slots 43 provided at the rear edge of the front spoiler 4 as guided by the surface of the front spoiler 4 of the wiper 100 indicates an S shaped corrugation, and those curved sections 421, 432 respectively provided to the longer slot 42 and two shorter slots 43 to prevent a further wind resistance. The laterally folded section 11 at the lower edge of the seat 1 guides the wind to fast rise due to that the central part of the seat is located at the highest level of the entire wiper 100. Consequently, the wind resistance coefficient is reduced to prevent the wiper 100 from jittering. The rear spoiler 5 functioning as were a reinforced rib rises up soonest after having been pressed down by the wind to prevent the seat from being deformed as the wiper 100 is operating. Meanwhile, a downward pressure is created by the turbulence to balance that from the front spoiler for achieving more reliable and consistent results of wiping off the storm water.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A wiper comprised of a wiper arm including a seat, two wings and two pairs of forks; a wiper blade fixed to those two pairs of forks; a front spoiler; and a rear spoiler is characterized by that: the front spoiler and the rear spoiler being respectively extended downwardly at a certain inclination from the front and the rear lower edges of the seat; the front spoiler related to a long plate having its both ends each made in a form of an arc angle; the surface of the front spoiler approximately indicating an S shape corrugation; the front edge of the front spoiler being curved downwardly; a longer slot and two shorter slots being provided at where the rear edge of the front spoiler extending from to the seat; both ends of the front spoiler being related to open ends; lower edges respectively of the longer slot, two shorter slots and two openings being each provided downwardly with a curved section; the rear spoiler having a lower central part and both ends slightly elevated; the outer edge of the rear spoiler being downwardly provided with a curved section; the wind pressure creating a pressure along the front spoiler, and escaping out of the longer and both shorter slots provided at the rear edge of the front spoiler to avoid presenting resistance; and the rear spoiler functioning as a reinforced rib to prevent the wiper from jittering and achieve more reliable results of wiping off storm water.

2. A wiper as claimed in claim 1, wherein, an advanced and laterally folded section is provided at the lower edge of the seat in relation to the longer slot provided to the front spoiler; and the wind force fast rises up by means of the folded section to reduce wind resistance.

* * * * *